United States Patent [19]

Wu et al.

[11] Patent Number: 5,351,136
[45] Date of Patent: Sep. 27, 1994

[54] FACSMILE APPARATUS AND METHOD FOR SENDING AND RECEIVING PRIVATE INFORMATION

[75] Inventors: T. C. Wu; Ray-Ten Chen, both of Hsinchu; Wen-Pin Chang, Tao Yuan Hsien, all of Taiwan

[73] Assignee: Industrial Technology Research Institute, Hsinchu, Taiwan

[21] Appl. No.: 912,968

[22] Filed: Jul. 10, 1992

[51] Int. Cl.$^5$ .................. H04N 1/00; H04N 7/167; H04N 1/44; H04M 11/00
[52] U.S. Cl. .................. 358/440; 358/434; 358/407; 358/400; 355/201; 340/825.34; 379/95; 380/18
[58] Field of Search .......... 355/201; 380/18; 358/349, 400, 434, 407, 444; 340/825.34; 379/95, 100

[56] References Cited

U.S. PATENT DOCUMENTS

| | | | |
|---|---|---|---|
| 4,215,421 | 7/1980 | Giraud | 369/900 |
| 4,739,377 | 4/1988 | Allen | 355/201 |
| 4,900,902 | 2/1990 | Sakakibara | 379/100 |
| 4,956,666 | 9/1990 | Allen et al. | 355/201 |
| 4,980,719 | 12/1990 | Allen et al. | 355/201 |
| 4,985,919 | 1/1991 | Naruse et al. | 380/18 |
| 4,994,926 | 2/1991 | Gordon et al. | 358/407 |
| 5,014,296 | 5/1991 | Saigano | 379/100 |
| 5,090,049 | 2/1992 | Chen | 379/95 |
| 5,155,601 | 10/1992 | Toyama | 358/407 |
| 5,258,998 | 11/1993 | Koide | 358/434 |

FOREIGN PATENT DOCUMENTS 0173264 10/1982 Japan .
0164374 9/1983 Japan .
0049072 3/1984 Japan .

Primary Examiner—Edward L. Coles, Sr.
Assistant Examiner—Kimberly A. Williams
Attorney, Agent, or Firm—W. Wayne Liauh

[57] ABSTRACT

A FAX-receiving-and-output device for secret information and method therefore, which comprises a first and a second information transmission channels for transmitting non-secret information and secret information respectively; the second information transmission channel includes a memory for storage of secret information, and a memory for storage of identifying code and memory address of a secret information. To transmit a secret information, the sender first inputs the identifying code of the intended recipient of that information before transmitting that secret information. An identifying module at an receiving terminal would recognize such identifying case, and the secret information will be stored in a memory. An identifying code of the intended recipient will be printed out allow the intended recipient to enter the password with a keyboard of a card scanner for configuration; if every identification is correct the secret information will be printed out so as to allow the information to be transmitted in a secured manner.

5 Claims, 5 Drawing Sheets

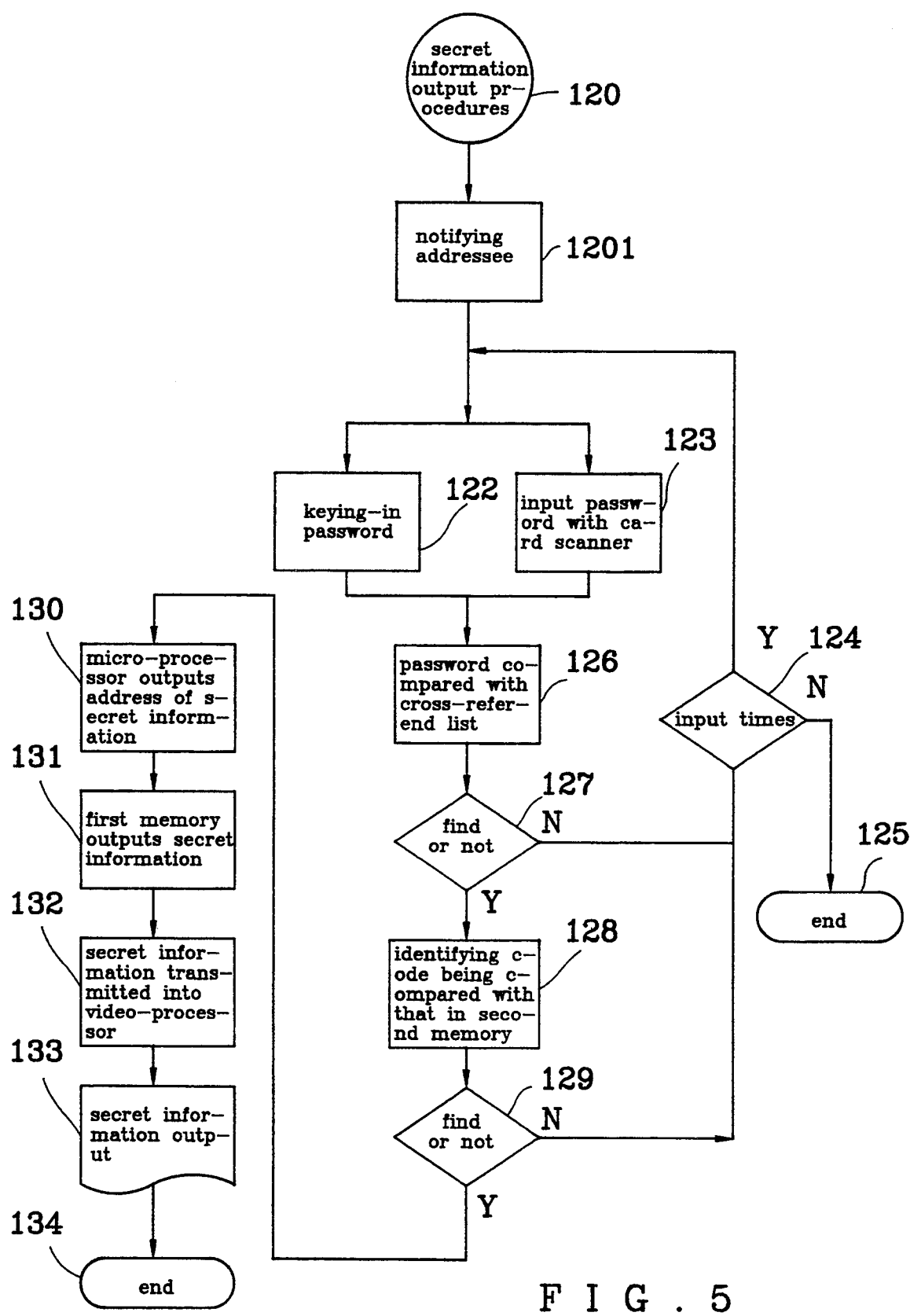
F I G . 5

FACSMILE APPARATUS AND METHOD FOR SENDING AND RECEIVING PRIVATE INFORMATION

BACKGROUND OF THE INVENTION

In recent days FAX machines have become a fast transmission means for information. In addition to the transmission function, some FAX machines have been incorporated with additional functions, such as a telephone function, a voice answering and recording function, making a copy, a scheduled transmission, and automatic dialing, etc. All such multi-functions FAX machines have been accepted widely by users in industrial and commercial circles.

However, all such FAX machines have a common drawback in that it is unable to keep an information under a secret and security condition during transmission. Particularly, an ordinary FAX machine is usually used by a plurality of users in the reception terminal regardless of whether the information is secret or non-secret; for instance, all personnel in one office or one department can bee secret information whether or not such information is of concern to them. As a result, some FAX users would not like to use such a FAX machine if secret or private information is involved; in other words, such a concern has become a serious annoyance and obstruction to the popularity of using FAX machines.

In order to overcome the aforesaid drawback in the current FAX machines, a technique has been made available which involves providing a thermal resin film on both sides of a FAX machine; the back side of the resin film is furnished with a dotted line. As soon as a piece of FAX paper is moved out of the machine the paper will be rolled up automatically; only the intended recipient's name is marked on the end of the FAX paper, and both ends of the rolled paper are sealed up for security purposes. The aforesaid auxiliary parts added to a conventional FAX machine would cause the machine to have a complicated structure and dimensions without effectively providing the result as expected. In real operation, the secret information can be easily accessed by a person, who can simply unseal the rolled papers. Moreover, any person may destroy the paper information after reading and knowing the transmitted information. Therefore the conventional security means would become useless.

SUMMARY OF THE INVENTION

This invention relates to facsimile apparatus, or commonly known as a fax machine, and method for sending and receiving secret or private information, and particularly to a FAX machine which has a transmission channel for transmitting secret information and a memory to store the secret information, and another memory to store an identifying code and memory address of information. By means of the aforesaid equipment, secret information can be transmitted to an intended recipient secretly.

The prime object of the present invention is to provide a FAX machine and the method thereof to receive and output secret information. Before a secret information is delivered, the intended recipient has to input an identifying code to verify that h or she is the intended recipient. In the FAX machine, there is an identification device to recognize a correct identifying code. As soon as the identifying code is proved correct, the secret information will be stored directly into a memory of the FAX machine int eh receiving end. Simultaneously, an identifying code of the intended recipient is printed out to notify the extended recipient to receive the secret information. A correct addressee may pick up the secret information by inputting his password with a code-inputting device, or a card scanner.

Another object of the present invention is to provide a FAX machine which has two information transmission channels. To transmit a non-secret information, the first information transmission channel will be used. When a secret information is transmitted, the second information transmission channel is used; simultaneously, the FAX machine in the receiving end has a memory for storing information, identifying code, and password so as to conduct a secret transmission.

Still another object of the present invention is to provide a FAX machine which can store a secret information and identifying code while transmitting a secret information, the information is stored in a first memory at the receiving terminal without waiting for the slow mechanical motion. As soon as the identification process for the password and the identifying code is completed, the recipient can receive a secret information immediate.

The other objects of the present invention are described in detail by means of the accompanying drawings as follows.

BRIEF DESCRIPTION OF THE DRAWINGS

FIG. 5 is a flow chart for the output of a secret information.

Referring to FIG. 1, the block diagram according to the present invention comprises a network control interface 1, a telephone set 2, a voice module 3, a reception-selection module 4, a modem module 5, a data processor 6, an identification module 7, a data transmission-channel module 8, a first memory 9, a decoder 10, a second memory 11, a micro-processor 12, an i/o operation module 13 with operation keys 151, a secret information i/o module 14, an identifying code and password setting module 15 included module 13, and a video-processing module 16. The network control interface 1 is connected with an electric communication line F carrying signal, which is to be transmitted to a telephone set 2 or a voice module 3; the module 3 includes a voice switching unit 31 and a voice unit 32. When a signal passes through the network control interface 1 and the voice module 3 to the reception-selection module 4, the module 4 will judge whether the FAX machine is in "ready" condition or not; if it is not ready, the voice module 3 will be turned on to cause the voice switching unit 31 to operate the voice unit 32, which will generate a voice signal, for example, "the line is busy, please wait a moment and dial again"; if the FAX machine is in ready condition, the voice unit 32 will send out a voice signal of "when transmitting a secret information, please key in an identifying code of the receiver before transmitting the secret information; if it is not a secret information, omit the aforesaid signal." The reception-selection module is used for identifying whether the FAX machine is in a ready or not-ready condition, and for controlling the voice module 3 to generate a voice output.

As shown in FIG. 1, the modem module 5 is used for modulation and de-modulation during the operation (i.e., transmission and reception) of the FAX machine. The data processor 6 is used for a compressed encoding and an expanded decoding during the transmission and reception. The micro-processor 12 is used for receiving data from the first and the second information transmission channel units 81 and 82; the first information transmission channel unit 81 is used to transmit a non-secret information (i.e., an ordinary information). The microprocessor 12 can directly control a video-processing module 16, in which a scanning unit 161 and a printing unit 162 can provide the output of an ordinary information. In the event of transmitting a secret information, the second information transmission channel unit 82 is to be used; the second information transmission channel unit 82 is further provided with several other units such as an identifying module 7, a decoder 10, a first memory 9, a second memory 11, a secret information i/o module 14 and an i/o operation module 13; the identifying module 7 is used to check the information transmitted to determine whether it is secret information or ordinary information, and it will decide whether the first and the second information transmission channel units will be turned on or off. When the identifying module 7 detects that the information being transmitted non-secret information (i.e., having no identifying code), it will set the first information transmission channel unit 81 in a turned-on state to allow the non-secret information to enter the micro-processor 12, and to be printed by the video-processing module 16. In the event that the identifying module 7 senses that secret information is being transmitted (i.e., having an identifying code), the first information transmission channel unit 81 will be turned off, while the second information transmission channel unit 82 will be turned on; that secret information will be stored in the first memory 9 via the micro-processor 12 and the decoder 10; the identifying code and the memory address of that secret information will, through micro-processor 12, be stored in the second memory 11; simultaneously, the micro-processor 12 will actuate a printing unit 162 in a video-processing module 16 to print out the identifying code of that secret information to notify the intended recipient. The intended recipient can then enter the pass word to pick the secret information through a secret information i/o module 14 and an i/o operation module 13 (to be described later). A data compressor 121 is installed between a decoder 10 of the first memory 9 and the micro-processor 12; the data compressor 121 is adapted to cause the data to be compressed before being transmitted into the first memory 9 so as to save storage space.

FIG. 2 illustrates a better arrangement of an embodiment for the i/o operation module 13; in real operation, the arrangement is the actual related position shown on the control panel of a FAX machine; on the control panel, there is an identifying code and password setting module 15, a secret information i/o module 14 including a keyboard unit 141 and a card scanner 142, a display screen 17, a function key board 18 and a digital keyboard 19. The identifying code and password setting module 15 includes a plurality of keys for setting code, input of identifying code, input of password, storage and re-set. The keyboard unit 141 includes keys for reading out a secret information, keying method, cardreading method, cancel and inquiry.

A user may, by using the aforesaid panel arrangement, operate the FAX machine for setting and transmitting identifying code, and password; a given number of identifying codes and passwords may be set in accordance with the number of intended recipients of the FAX machine is magnetic identifying card may be used to replace the password for each intended recipient) so as to facilitate transmission of a secret information. Each intended recipient's identifying code may be printed in his or her name card, or may notify the transmission person of a secret information. A password (secret code) can only be used by the intended recipient himself (or herself). The aforesaid identifying codes and passwords are set and put in a cross-reference table, which is to be stored in the second memory 11 as shown in FIG. 1 for confirmation later in the communication process.

Figure 3:
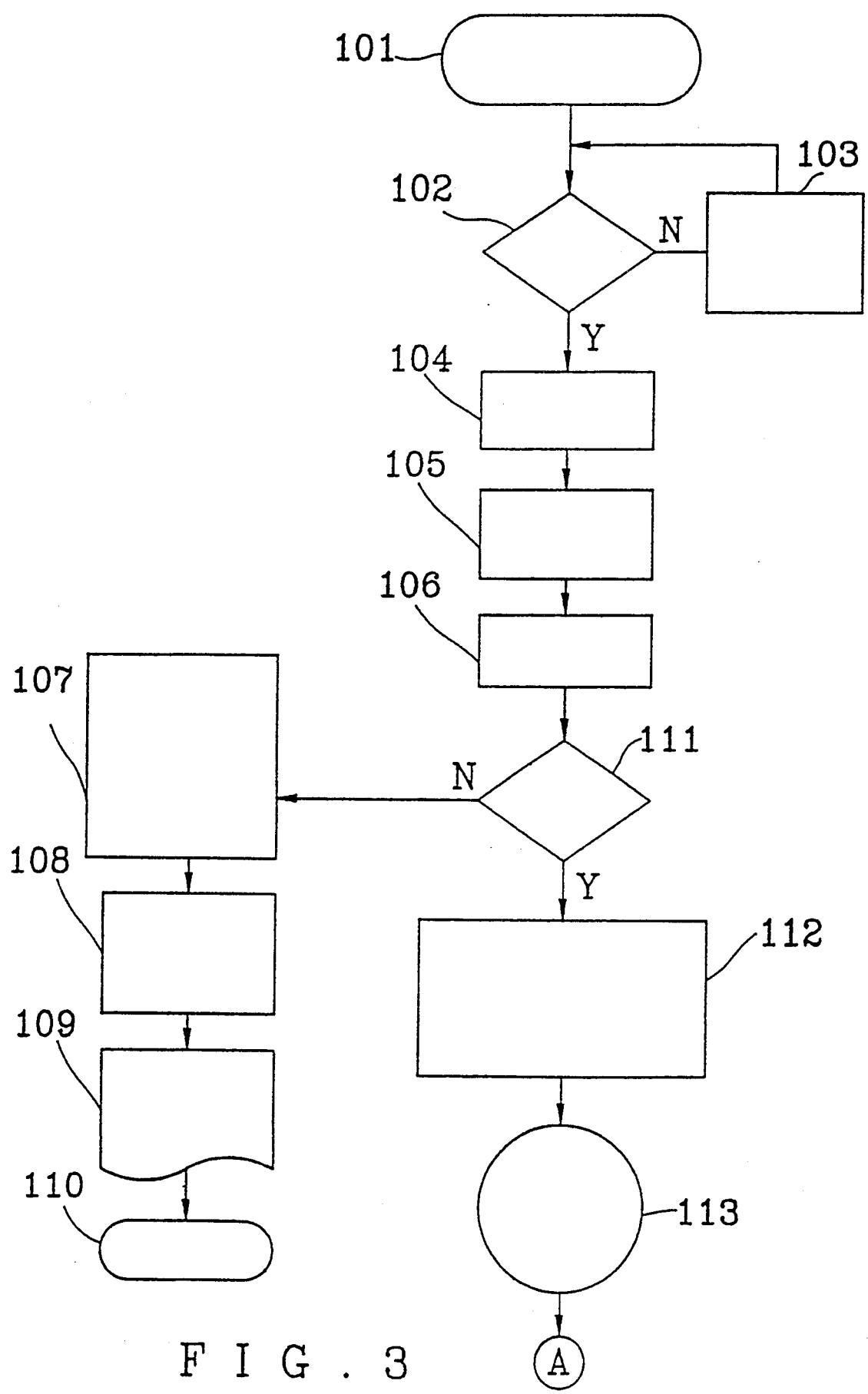
FIG. 3 is a flow chart for identifying a secret information according to the present invention.

A process flow chart of the present invention will be described in detail as follows: FIG. 3 illustrates an identification flow chart 1021 of a secret information according to he present invention. According to the flow chart Step 101 and Step 102, a reception-selection module 4 (as shown in FIG. 1) first indicates whether the flow chart is ready or not, and whether the FAX machine is in "ready" state; if not ready, a voice module 103 will be started to repeat the "ready or not ready" cycle. If the FAX machine is ready, a voice unit 104 will be started for reception of a FAX information 105., The next step is an identification module as shown in FIG. 1 for identifying an identifying code through an identification module 106 and an identification step 111. If no identifying code is detected (i.e., not a secret information), the first information transmission channel unit in the execution control step 107 will be turned on, while the second information transmission channel unit therein will be turned off; then, the non-secret information will pass through the first information transmission channel unit to enter next step, i.e., a FAX information transmitted to video processor 108; then, the FAX information is transmitted to a video-processing module 16 as shown in FIG. 1. Finally, the information passes through the step of output FAX information 109 to an end 110 to complete a transmission operation. In the aforesaid identification step 111, if an identifying code (i.e., a secret information transmission) is detected, the process control step 112 will be actuated, i.e., the first information transmission channel unit will be turned off, while the second information transmission channel unit will be turned on; then, the secret information will enter a secret information storage step 113 as shown in FIG. 4.

Figure 1:
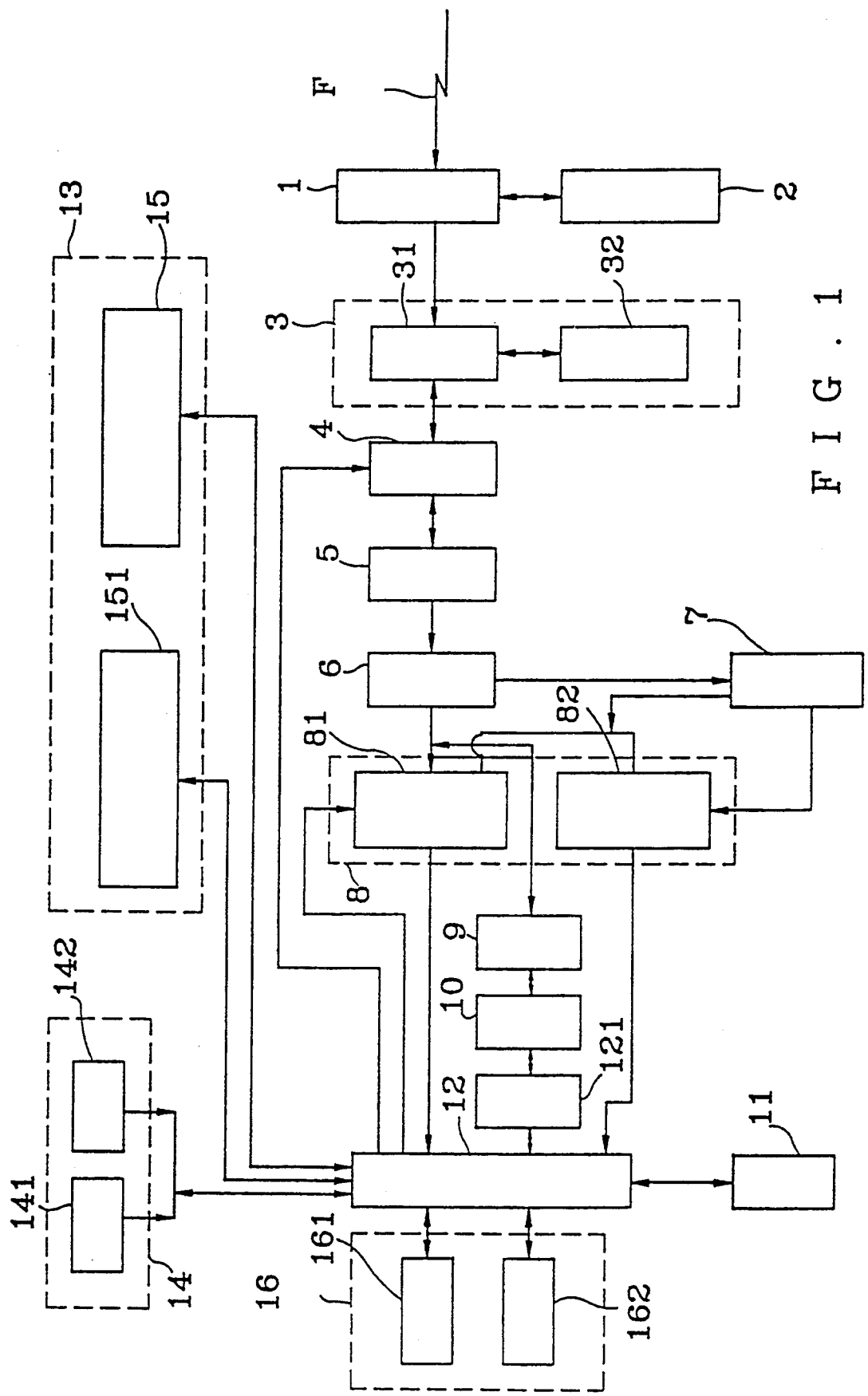
FIG. 1 is a block diagram of a device according to the present invention.
Figure 2:
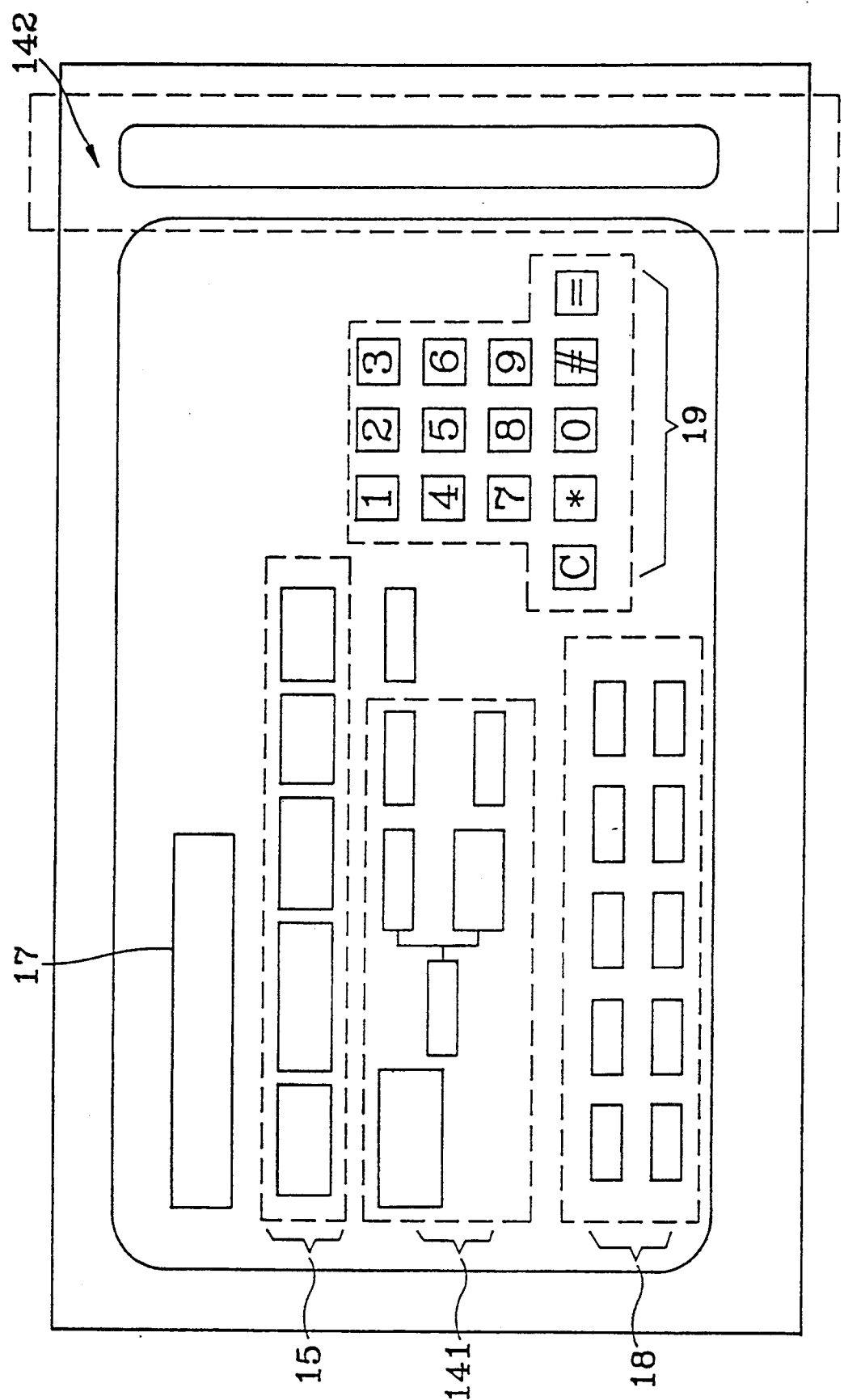
FIG. 2 is a block diagram of the present invention, showing the arrangement of the input/output-and-operation module thereof.
Figure 4:
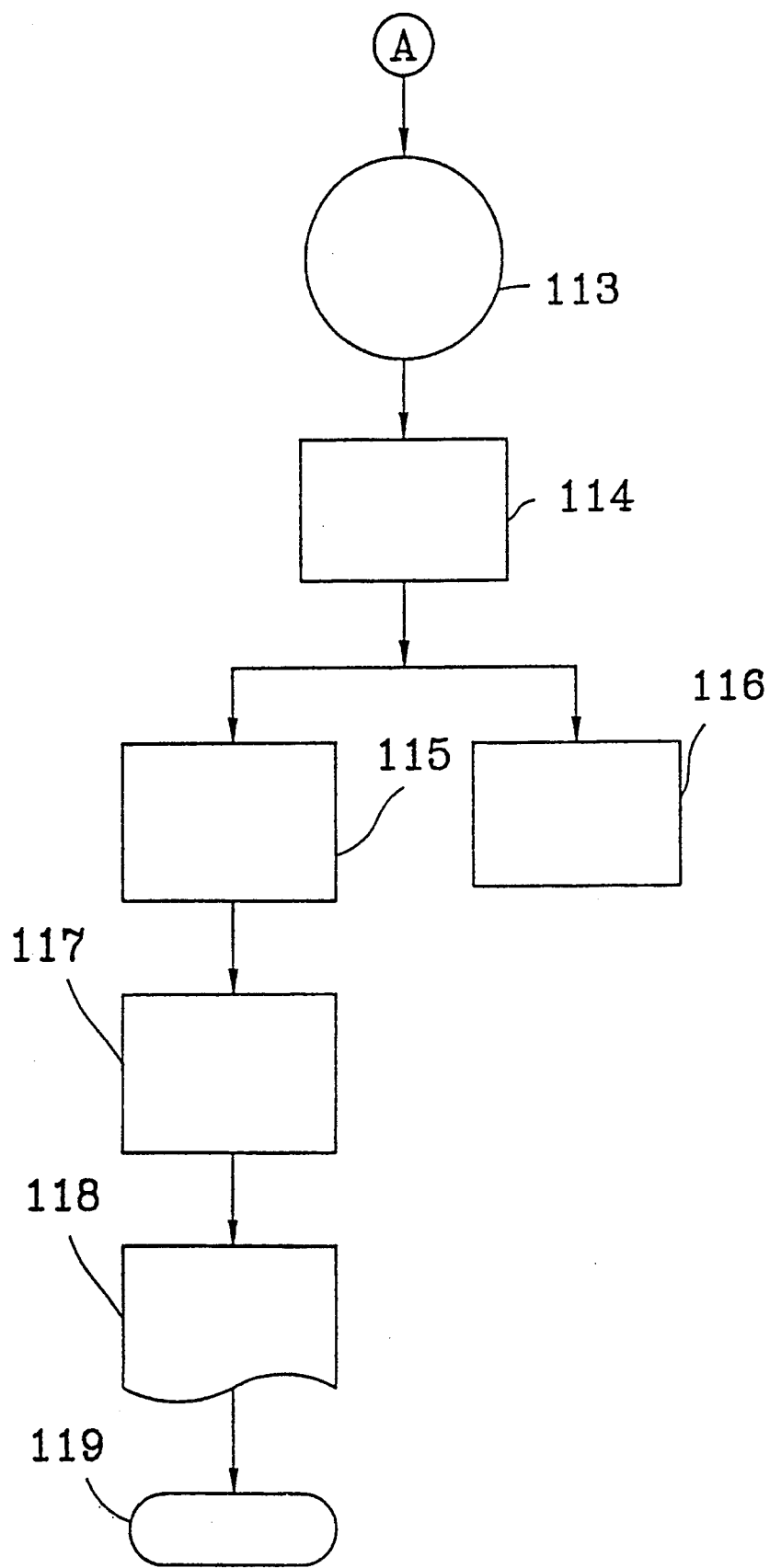
FIG. 4 is a flow chart for the storage procedures of a secret information.

After the secret information storage step 113 is started as shown in FIG. 4, a secret information 114 will be stored in step 116 (i.e., the first memory 9 as shown in FIG. 1); simultaneously the storage step 115 by means of the second memory will be used for storing the identifying code and the memory address of the secret information; then, the step 117 is started to have an identifying code transmitted to a video-processor before entering the next step 118 of printing out the identifying code through a printing unit to notify an intended recipient, and then the process will end at step 119 (waiting step).

After the aforesaid flow chart is completed, an intended for recipient has been notified of the arrival of the secret information; then, another flow chart will be started from the secret information output procedures 120 as shown in FIG. 5; after step 1201 (the intended fax recipient having been notified), a method-selection step has to be followed to determine whether a key-in password method 122 or a card-reading method 123 is used to input a password. As soon as the intended recipient determines one of the aforesaid methods, the password will be put in the micro-processor 12 as shown in FIG. 1 so as to have the input password and an identifying code stored in the second memory 11 compared with a cross-reference list for confirming the password in step 126. Step 127 checks whether a correct password is confirmed or not; if a correct password is not found, a number of times-counting step 124 will be followed; when the number of times counted exceeds a given value N, and a correct password is not found, the secret information output procedures will be ended at END 125 so as to keep secret for the information therein. If a correct password is found in step 127, the step 128 will follow to compare the identifying code with identifying code and address that stored in the second memory 11. In step 129, if the identifying code is not correct, the flow chart will soon be ended after the times counting step being completed; in that case, the secret information is still not output. If an identifying code is proved correct, the step 129 will follow to send out an address of the secret information from the micro-processor in step 130; then, a secret information will be sent out from the first memory 9 in step 131; in step 5 132, the secret information will be transmitted into a video-processor; the secret information will be sent out in step 133, and the output procedures of the secret information will be ended in step 134 (END). During the secret information output procedures, the micro-processor may send out a control signal to cause the reception-selection module as shown in FIG. 1 to be in "non-ready" state, and simultaneously to cause the voice module to send a signal to the opposite sending side that the information may be transmitted later by re-dialing the telephone set.

We claim:

1. A FAX machine for sending and receiving secret information comprising:
   - a network control interface for connecting said FAX machine and a telephone line;
   - a reception-selection module to set said FAX machine in a transmitting or reception state via said network control interface said telephone line in accordance with instructions from another FAX machine that has been connected to said FAX machine;
   - a micro-processor and a video-processing unit;
   - a first information transmission channel unit for transmitting/receiving non-secret information to or from said reception-selection module, and for transmitting said non-secret information to said micro-processor, said micro-processor being connected to said video-processing unit o said FAX machine for sending information thereto;
   - a second information transmission channel unit for receiving secret information from said reception-selection module, and for transmitting said secret information into said micro-processor;
   - a first memory for storing said secret information from said second information transmission channel unit;
   - a second memory for storing a cross-reference list between identifying codes and passwords, and for storing the identifying code and memory address in said first memory of said secret information received through said second information transmission channel unit;
   - an identifying module connected to said first and second information transmission channel units for detecting whether information transmitted to said FAX machine contains an identifying code or not and for identifying said information as secret information or non-secret information according to whether said identifying code is present; said identifying module being adapted to control on/off of said first and second information transmission channel units to thereby direct non-secret information to pass through said first information transmission channel unit, and secret information to pass through said second information channel unit; and
   - an i/o operation module and a secret information i/o module in said i/o operation module, said i/o operation module being connected to said micro-processor and said secret information i/o module including a keyboard unit and a card scanner, which allows a receiver to use said keyboard unit or said card scanner to enter said identifying code and its matching password to thus retrieve said secret information from said first memory.

2. The FAX machine as claimed in claim 1, which further comprises an identifying code and password setting module in said i/o operation module; said identifying code and password setting module being adapted for setting a cross-reference list containing identifying codes and their corresponding passwords which are to be stored in said second memory and against which an identifying code and its corresponding password entered via said secret information i/o module are checked in order to retrieve said secret information.

3. The FAX machine as claimed in claim 1, which further comprises a voice module which includes a voice switching unit and a voice unit, said voice switching unit being adapted for controlling the output from said voice unit for sending a voice message informing sender to send an identifying code if secret information is to be sent.

4. A method for sending and receiving secret information via facsimile transmission comprising steps of:
   (a) identifying whether an incoming facsimile information is secret information or non-secret information by detecting if an identifying code is contained in the beginning of said facsimile information, if so, said facsimile information will be directed to pass through a second information transmission channel unit in a facsimile apparatus and proceeded to step (b) below; if said facsimile information does not contain an identifying code, then said information will be directed to pass through a first information transmission channel unit and printed;
   (b) storing said secret information in a first memory in said facsimile apparatus via said second information transmission channel unit;
   (c) storing the identifying code and address of said secret information in said first memory in a second memory, also in said facsimile apparatus;
   (d) printing said identifying code as an output from said facsimile apparatus to signal the existence of said secret information and its intended recipient;

(e) outputting said secret information after said identifying code and its matching password are entered and verified against a cross-reference list of identifying codes and corresponding passwords stored in said second memory.

5. The method as claimed in claim 4, wherein said identifying code and password are entered using a keyboard or by means of card scanning.

* * * * *